United States Patent [19]
Hoffman

[11] 4,416,211
[45] Nov. 22, 1983

[54] INDICATOR DEVICE WITH CALIBRATION MEANS

[76] Inventor: Leslie J. Hoffman, 821 Derby-Milford Rd., Orange, Conn. 06477

[21] Appl. No.: 318,312

[22] Filed: Nov. 4, 1981

[51] Int. Cl.$^3$ .......................... G01D 5/06; G01D 5/42
[52] U.S. Cl. .................................. 116/204; 73/744; 200/84 C; 324/74; 324/146; 335/222
[58] Field of Search ............. 116/204, 267; 200/84 C; 335/207, 222; 73/744, 4 R; 324/146, 74

[56] References Cited
U.S. PATENT DOCUMENTS

| | | | |
|---|---|---|---|
| 2,201,836 | 5/1940 | McCune | 116/204 X |
| 3,094,659 | 6/1963 | Pfeffer | 324/146 |
| 3,140,690 | 7/1964 | Siebel | 116/267 |
| 3,429,291 | 2/1969 | Hoffman | 116/267 |
| 3,713,024 | 1/1973 | Banus | 324/146 |
| 3,867,696 | 2/1975 | Raymond | 324/74 X |
| 3,927,553 | 12/1975 | Frantz | 73/4 R |
| 3,998,179 | 12/1976 | Dieterich et al. | 73/432 A |
| 4,039,985 | 8/1977 | Shlesinger, Jr. | 335/207 X |
| 4,213,110 | 7/1980 | Holce | 335/207 |

Primary Examiner—Daniel M. Yasich
Attorney, Agent, or Firm—H. Gibner Lehmann; K. Gibner Lehmann

[57] ABSTRACT

An easily calibrated indicating device for monitoring pressures or other parameters that vary, comprising a housing having a scale plate with indicia representing a range of values, and an indicating member movable over the scale plate, for designating various values thereon. A driving permanent magnet is movable in the housing, and responds to changes in the parameter being measured. A movable follower permanent magnet is also provided in the housing, for reacting with the driving magnet, the follower magnet in turn being connected to the indicating member so as to shift the same in response to movement of the driving magnet. A third, trim or calibration permanent magnet is provided, which alters the reaction between the first two magnets, thereby enabling either an expansion or else a contraction of the range of movement of the indicator member to be had as it responds to a predetermined change in the condition being measured. A mechanical joint is provided at the connection between the follower magnet and the indicating member, enabling the latter to be relatively shifted so as to obtain a "zero" adjustment independently of the magnetic interactions.

31 Claims, 24 Drawing Figures

INDICATOR DEVICE WITH CALIBRATION MEANS

BACKGROUND

This invention relates generally to indicator devices such as differential pressure gauges and the like, and more particularly to devices of this type which incorporate a driving permanent magnet that moves in response to changes in pressure conditions, and a follower permanent magnet which reacts with the driving magnet and which carries an indicating member intended to move across a scale.

Figure 1:
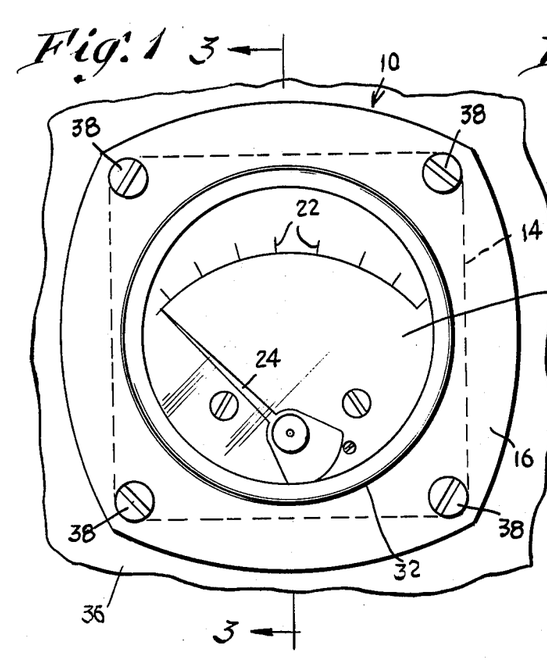
FIG. 1 is a front elevational view of an indicating device made in accordance with the present invention, in the form of a differential pressure gauge.

In particular, the present invention involves improvements in the construction disclosed and claimed in may U.S. Pat. No. 3,429,291 dated Feb. 25, 1969 and entitled DIFFERENTIAL-PRESSURE RESPONSIVE INDICATOR. The device shown in my above patent is of the type intended to measure differential pressures for gas, liquids such as water, or other chemical substances, etc., that is, differences in pressure for instance between two oil lines that are intended to be connected to oppositely disposed ports of the indicator. As shown in FIG. 1 of the patent, the indicator has a scale 38 and a pointer 36 carried by a follower magnet 26; a driving magnet 12 is disposed against and movable with a piston 16 disposed in a cylinder 14. A spring 22 can move the magnet 12 and piston 16 toward the left in the absence of a pressure difference between the left and right ports.

While the above construction has found important use for many years and has provided a very satisfactory performance over this period of time, several areas of the design were susceptible to improvement. With the particular instrument shown in the patent, the tolerances on the spring 22 were such that there could occur slight variations in the force exerted by the spring on the magnet 12 from unit to unit, these being on the order of ±10% for commercial springs. Under such circumstances, it was necessary to secure the pointer 36 to the magnet 26 by hand at a suitable zero point setting; however slight variations in the spring constant could give rise to undesired expansion or contraction of the scale over which the pointer 36 moved, depending on the particular stiffness of the spring. The characteristic variation between springs was compensated for by calibrating the scale plate 38 for each individual instrument and thereafter spotting a series of points thereon, marking such points with scale lines and applying numerals or other markings to the scale plate 38 by hand drawing, or else by transfer of decals or decal-like letters. While such a procedure provided high accuracy, since each scale plate 38 was calibrated individually the arrangement proved to be costly from the manufacturing standpoint due to the time involved in such individual calibration.

Attempts to improve the calibrating procedure for the instrument so as to eliminate the necessity for unit-by-unit attention and work did not meet with much success, because of the relatively poor tolerances obtainable with the springs 22. Accordingly, it was considered that easy calibration of these instruments, whereby pre-printed dials could be used, was not practical by economical mechanical means.

In addition to the relatively high manufacturing cost involved with individual calibration of each instrument, the patented construction did not incorporate any arrangement for recalibrating the unit in the field, or else modifying the instrument to any extent in order to adapt it to slightly different applications. Accordingly, there arose problems regarding the distributor's inventory, as to just what instruments should be kept in stock.

It can be readily appreciated that differential pressure gauges of the type noted above are generally used in a number of different applications, and it was considered important to be able to adapt a particular instrument to suit applications requiring minor deviations from the basic instrument design. The device shown in the above patent did not have such a capability.

Other prior differential pressure gauges also had the same drawbacks, as regards tolerances of commercial compression springs; and the problem of compensating for the wide variations in spring stiffness, spring length, wire twist and other variables appears to be widespread throughout industry. In many instances, instrument grade springs or mechanical adjustment means were resorted to, which added considerable cost to magnetic drive instruments wherein, for example, one permanent magnet was used as a driving magnet and another permanent magnet was used as a follower. In this type of instrument, the reactive forces are normally not extremely strong, and therefore the friction factor had to be considered, as well, thereby introducing still another variable where the desire was to eliminate variables and simplify the structure, rather than adding components and making the structure more complicated.

SUMMARY

The above disadvantages and drawbacks of prior indicator devices are obviated by the present invention, which has for one object the provision of an improved indicating instrument wherein the range or span of the indicator member can be readily changed by magnetic means, so as to expand or contract it, preferably by a simple adjustment that could be made from the front or back of the instrument, thereby greatly simplifying the calibration of the device.

A related object of the invention is the provision of an improved indicator as above, which enables a mechanical "zero" adjustment to be effected independently of the magnetic means that alters the range or span, and which is especially simple in its construction and reliable in operation, being significantly more adaptable to individual installations than any of the instruments previously known.

Another object of the invention is to provide an improved indicating instrument with a variable or adjustable movement range as above set forth, wherein the adjustment capability will not adversely effect the overall accuracy of the instrument.

Still another object of the invention is to provide an improved instrument having an adjustable movement as above characterized, which will enable pre-printed dials to be readily employed, with the instrument being capable of calibration to suit such dials.

Yet another object of the invention is to provide an improved indicator in accordance with the foregoing, which is both rugged and reliable especially over extended periods of use, whereby it will have a long, useful life.

A still further object of the invention is to provide an improved instrument, as above described, which readily lends itself to adjustment in the field so that if the calibration must be slightly altered following shipment, this can be readily accomplished. This invention also provides for complete range changes in the field, to different pre-printed dials.

The above objects are accomplished by the provision of an indicating device with unique adjustable movement, for monitoring or measuring differential pressures or other parameters that vary, comprising a housing or support having a scale plate with indicia representing a range of values, and an indicating member carried by the housing or support and movable over the scale plate, to designate various values thereon. A driving permanent magnet is movable in the housing, and responds to changes in the parameter being measured. A follower permanent magnet is also provided, to react with the driving magnet, the follower magnet in turn being connected to the indicating member so as to shift the same in response to movement of the driving magnet. A third, trim or calibrator magnet is also provided, which alters the magnetic reaction between the first two permanent magnets, thereby enabling either an expansion or else a contraction of the range or extent of movement of the indicator member to be had as it responds to a predetermined change in the condition or parameter being measured. The three permanent magnets require a specific relative placement, and the follower and calibrating or trim magnets can be turnable about parallel axes, with only the follower magnet freely turnable. The correlation between the magnetic fields of all three of the magnets determines the movement response, its extent and also accuracy. Simple adjustment means for the calibrating magnet enable the instrument to be quickly and accurately calibrated to suit the pre-printed dial or scale plate. Mechanical means are provided in the connection between the follower magnet and the indicating member, enabling the latter to be relatively shifted so as to obtain "zero" adjustment independently of the magnetic interactions.

Other features and advantages will hereinafter appear.

In the drawings, illustrating several embodiments of the invention.

Referring first to FIGS. 1-4, there is illustrated an adjustable indicating device of the type employed to monitor or measure a changeable differential-pressure condition that can vary, the device being generally designated by the numeral 10 and comprising a support or housing 12 having a mounting plate 14 co-operable with a face plate 16, and having visual indicating means generally designated by the numeral 18. The indicating means 18 comprises a scale plate member 20 carried by the support 12 and having calibrating indicia 22 over which a pivotally-mounted indicating or pointer member 24 (also carried by the support 12) can move in an arc, as seen in FIG. 1. The means 18 can include a cup-shaped pointer casing 26 having an annular flange 28. Disposed against the front lip of the flange 28 is a transparent window 30, which is held in place by means of a bezel 32. The pointer casing 26 can be secured to the housing 12 by means of multiple screws 32, as in FIG. 3.

Figure 2:
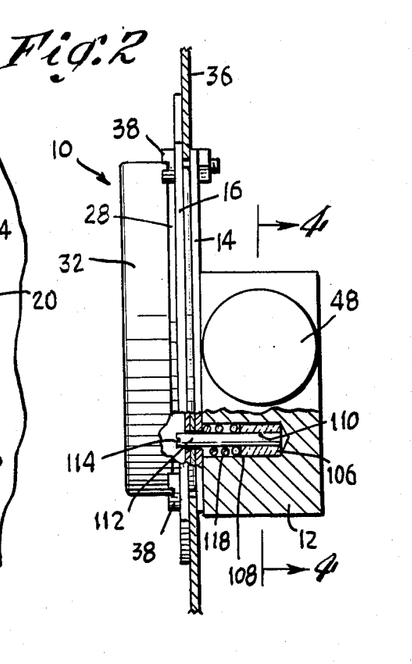
FIG. 2 is a side elevation, partially in section, of the device of FIG. 1, particularly illustrating the trim or calibrator magnet associated therewith.

The indicating device can be secured to a panel 36, as in the manner illustrated in FIG. 2, wherein the panel 36 is sandwiched between the face plate 16 and mounting plate 14, and secured by means of four mounting screws 38. Other means of mounting, such as front or back flanged cases to panels, bracket mounting to equipment, walls or pipes, and simple pipe line mounting are all common ways of mounting this instrument.

Figure 4:
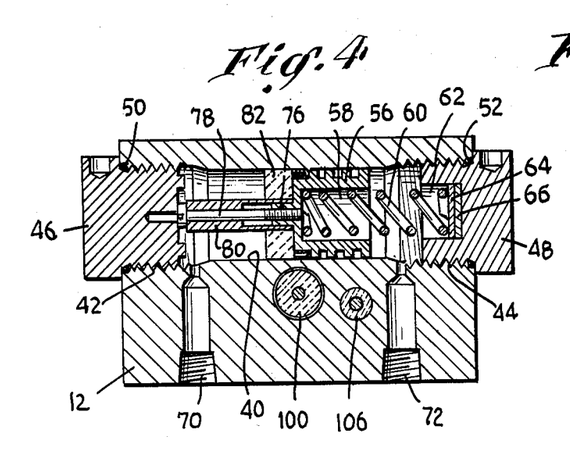
FIG. 4 is a section taken on the line 4—4 of FIG. 2.
Figure 5:
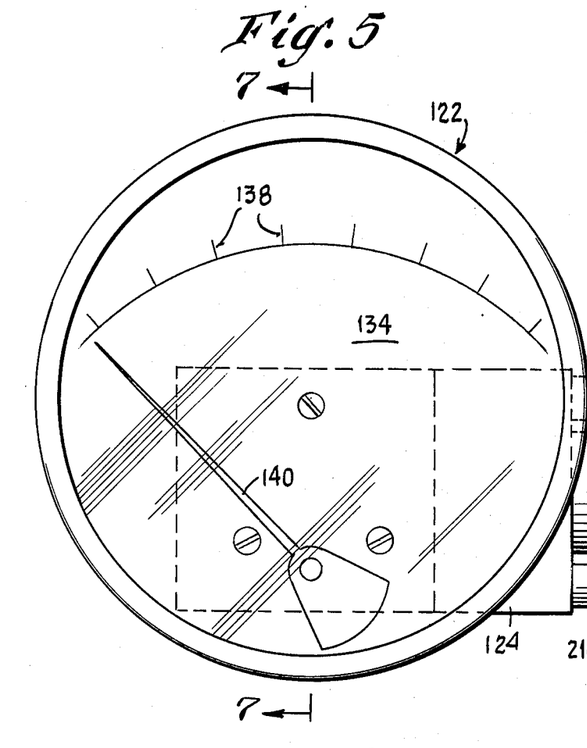
FIG. 5 is a front elevational view of a modified indicating device, constituting another embodiment of the invention.

Referring to FIG. 4, the support or housing 12 has a longitudinal bore 40 with treaded portions 42, 44 at its opposite ends, into which end caps 46, 48 are screwed. Suitable O-rings 50, 52 provide a seal between the end caps 46, 48 and the respective threaded portions 42, 44.

Slidable in the bore 40 is a piston 56, having a hollow portion 58 constituting a seat for one end of a compression spring 60. The end cap 48 has a recess 62, and can optionally include one or more spacer members 64, 66 against which the opposite end of the spring 60 bears. The housing 12 is preferably constituted of non-magnetic material, such as aluminum, brass, etc., and has pressure ports 70, 72 which are adapted to be connected to pressurized lines. The locations of these ports are shown as bottom ports, for convenience only, as they may be placed in other locations as required, including the end caps.

In the present instance, the indicating device, which is adapted to have its range either expanded or contracted with compensatory "zero" adjustment is in the form of a differential pressure gauge that is intended to monitor pressure differences that occur between the lines connected to the ports 70, 72 which are shown in this location for convenience. The piston 56 has a small tubular threaded extension 76 into which there extends a screw 78 carrying a tubular spacer 80. The spacer 80 and screw 78 constitute a stop for the piston 56, thus limiting movement of the latter in one direction as can be readily understood.

Disposed on and rigid with the piston 56 is a permanent driving magnet 82 having a cylindrical configuration as shown, such that it can be fitted in end-to-end relation to the piston and secured thereto by means of the screw 78 and tubular spacer 80 as required. The magnet 82 can be constituted of ceramic material, or alternately may be of metal composition. The magnetic polarization is along the axis, such that one end of the magnet cylinder is represented by a north pole, with the opposite end of the cylinder being a south pole.

Figure 3:
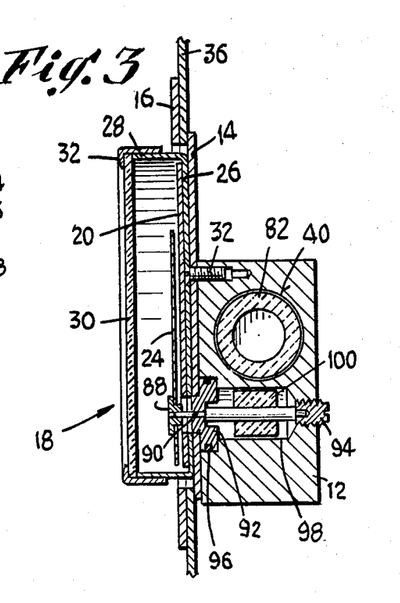
FIG. 3 is a section taken on the line 3—3 of FIG. 1.

Referring now to FIG. 3, in accordance with the present invention the pointer 24 is frictionally mounted, specifically as can be seen in the drawings, by being carried by a hub 88 which is pressed onto a small shaft 90 that in turn is carried in bearings 92, 94. The hub and shaft constitute a mechanical friction slip joint which provides for "zero" adjustment of the pointer 24 independently of the magnetic interactions of the instrument, as is also pointed out below. The bearing 92 has an optional O-ring 96, as shown, for weather sealing, and disposed in a cylindrical bore 98 of the housing 12 is a follower permanent magnet designated 100. This follower magnet 100 is so polarized that it has magnetic poles on opposite sides of an axial plane. The magnet 100 is rigidly carried on the shaft 90, whereby rotation of the magnet 100 will cause arcuate movement of the pointer 24. The arrangement is such that, as the piston 56 is driven either toward the left or toward the right as viewed in FIG. 4, the magnet 82 will effect a turning movement of the follower magnet 100, which in turn will be reflected by changes in the angular position of the pointer 24. The pointer thus gives an indication of the difference in pressure of the lines that are connected to the ports 70 and 72. Operation of the above-described instrument will be described in more detail below. In the above structure, the housing 12 with its bore 40, the driving magnet 82, the follower magnet 100 and the shaft 90 with its bearings 92, 94 are seen to constitute a means operationally coating with means, such as the piston 56 that is responsive to a change in a condition, i.e. a differential pressure condition, for shifting the indicator member 24.

In accordance with the present invention, adjustable magnetic means are provided for altering the reaction between the magnets 82 and 100 so as to effect either an expansion or contraction of the range or extent of movement of the pointer 24 as the magnet 100 responds to predetermined changes in the condition being monitored, in this case pressure. In accomplishing this, there is provided an additional, calibrating or trim permanent magnet particularly illustrated in FIGS. 2 and 4 and designated by the number 106. The magnet 106 is disposed within the sphere of influence of the driving permanent magnet 82 and the follower permanent magnet 100, being generally circular or cylindrical in configuration, and being received in a tubular bore 108 in the housing 12. Preferably it has an axial bore 110, in which there is an adjustment stud 112 shown as having a slot 114 at its front, so as to permit engagement by a suitable tool such as a screwdriver.

Disposed between the magnet 106 and the mounting plate 14 is a compression spring 118 which provides a frictional drag between the magnet 106 and the housing 12, such that upon adjustment of the angular position of the magnet 106, the spring 118 will retain it in the adjusted position. Further, in accordance with the invention, the magnetic poles of the trim magnet 106 are disposed on opposite sides of an axial plane, thereby enabling the magnet to alter the reaction of the follower magnet 100 during changes in the longitudinal position of the driving magnet 82. That is, the extent of angular movement of the pointer 24 can be magnetically altered, for a given longitudinal displacement of the magnet 82, by rotatable adjustment of the trim magnet 106. The magnet 106 thus constitutes a magnetic calibration means, by which an expansion or contraction of the extent of movement of the indicating device can be readily accomplished, as will be outlined below.

I have found that the relative sizes of the driving magnet 82, the trim magnet 106 and the follower magnet 100 are important, as well as their relative positions. The best results are obtained when the trim magnet 106 has roughly one seventh the influence over the follower magnet 100 as does the driving magnet 82. The term "influence" relates to the net attractive force of a magnet resulting from its position, and the distance from the second magnet that it is affecting, as well as the relative sizes, and the material of which the magnets are constituted.

Further, in accordance with the invention there are compensatory means providing an adjustable mechanical connection between the follower permanent magnet 100 and pointer 24. In accomplishing this, there exists a frictional fit between the hub 88, FIG. 3, and the shaft 90. Such a mechanical arrangement enables the pointer 24 and hub 88 to be merely pulled off the shaft 90 and reinstalled thereon at different positions. Accordingly, the connection between the magnet 100 and pointer 24 is not a fixed relationship, but instead can be readjusted. With the above construction, the indicating device can be compensatingly reset to "zero", as required, each time the pointer movement over the scale plate is expanded or contracted. This enables the manufacturer to have virtually complete, easy control over the calibration of the instrument, enabling "zero" compensation mechanically to be made for slight mechanical variations and magnetic field strength variations between the magnet 82 and magnet 100, as well as for variations in the stiffness constant of the spring 60 against which the piston 56 moves.

I have found that while the preferred positional relationship between the three magnets is where the distance between the surface of the follower magnet 100 and the adjacent surface of the driving magnet 82 is roughly 50% of the distance between the surface of the trim magnet 106 and the adjacent surface of the follower magnet 100, or where the trim magnet 106 is closer to the follower magnet 100 than it is to the driving magnet 82 at all times during the movement of the driving magnet 82 throughout its range, variations in this relationship are likely to be possible within a framework of the trim magnet 106 influencing the follower magnet 100 one-seventh that of the driving magnet 82.

Combined magnetic and mechanical (for "zero") calibration of the device is seen to be a relatively easy matter.

In particular, calibration pressure lines may be connected to the ports 70 and 72, and a zero pressure differential applied thereto. The pointer 24 can be temporarily mechanically removed by gentle pulling on the hub 88, and thereafter re-installed on the shaft 90 at the "zero" point on the scale plate 20, corresponding to zero pressure differential (or that pressure differential for which it is desired that the instrument read on the left extreme of the scale plate 20 in FIG. 1). Then an increased calibrated pressure is applied to the ports 70, 72, and the pointer 24 will deflect by a predetermined amount which may or may not be the correct reading for the applied pressure. If slight magnetic adjustment is required, the trim magnet 106 can be turned with a screwdriver to bring the pointer 24 either up or down scale. Then the pressure is reduced to the "zero" figure again in order to check the zero point, which may have shifted due to the adjustment of the trim magnet 106. If necessary, mechanically the pointer member 24 and hub 88 can be temporarily removed from the shaft 90, and reset with respect to the scale member 20 to the "zero" point on the scale member, this being independent of the magnetic adjustment; and thereafter the calibration up scale can be rechecked. By proper alternative manipulation of both the hub 88 and the trim magnet 106, the desired calibration (expansion or contraction of the scale), as well as the desired "zero" point can be readily established. Since the above procedures can be readily accomplished by hand, very little time is required in calibration, and the capability of employing pre-printed dials for the scale plate is maintained, thereby reducing the overall manufacturing expense. With a little practice, the personnel that are performing the calibration can develop a feel for the amount of adjustment that is required of the trim magnet 106, and also a feel for the influence of the setting of the trim magnet 106 on the "zero" point of the instrument. This influence is then mechanically compensated by the setting of the pointer member 24 on the shaft 90.

The angular location of the trim magnet 106 with respect to the median position of the driving magnet 82 is important, and the proper relationship should be maintained in order to secure accurate expansion and contraction characteristics of the instrument movement. For example, referring to FIGS. 1 and 4, it can be seen that substantially mid-scale deflection of the pointer 24 will ensure when the driving magnet 82 has attained the midway point in its movement from extreme left to extreme right. This midway point of the driving magnet 82, and the mid-scale deflection of the pointer 24 can be thought of as a "12 o'clock" position for reference purposes. For such position, the location of the trim magnet 106 would be generally along a line extending through the axis of the follower magnet 100 and occupying essentially an angular position corresponding approximately to the "3:20 o'clock" position. Putting it another way, the axis of the trim magnet 106 can be located in a plane common to the shaft 90 and which makes substantially a 13° angle measured clockwise, from the horizontal.

Moreover, the relative distances between the three permanent magnets are of importance. For instance, the axis of the trim magnet 106, by way of example, could be located 0.56 (approximately 0.5) inches to the right of the axis of the follower magnet 100, and 0.115 (approximately ⅛) inches below the plane of the axis of the follower magnet 100. Also, the axis of the follower magnet 100 could be located 0.65 (approximately ⅝) inches below the axis of the driving magnet 82. The driving magnet 82 could be ¾ inch in diameter, and the follower magnet 100 could be ⅜ of an inch in diameter. The trim magnet 106 could be ¼ of an inch in diameter. While these values have been found to give excellent results, it should be understood that other arrangements for the three magnets can be made without departing from the spirit of the invention. This includes other three-magnet combinations of other magnet sizes, either larger or smaller.

Figure 21:
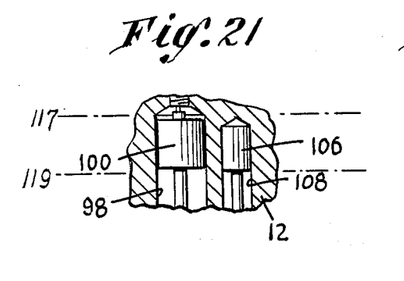
FIG. 21 is a section taken on the line 21—21 of FIG. 8, particularly illustrating the side-by-side disposition of the follower magnet and trim magnet.

FIG. 21 shows the side-by-side disposition of the trim magnet 106 and follower magnet 100. It can be seen that these magnets lie between adjacent transaxial planes, designated 117 and 119 respectively.

Figure 22:
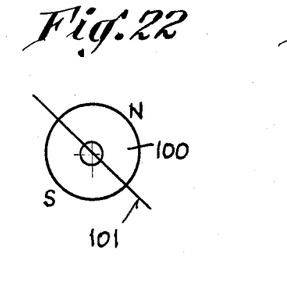
FIG. 22 is an end elevation of the follower permanent magnet, showing the magnetic poles thereof being disposed on opposite sides of an axial plane.
Figure 23:
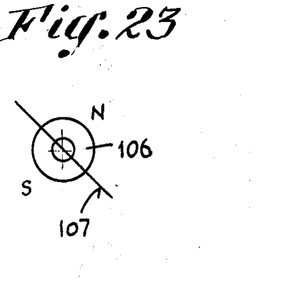
FIG. 23 is an end elevation of the trim or calibrator magnet, showing the magnetic poles thereof being disposed on opposite sides of an axial plane.

FIGS. 22 and 23 show respectively, in each elevation, the follower magnet 100 and trim magnet 106; it can be seen that the follower magnet 100 is of generally cylindrical or circular configuration, and has magnetic poles disposed on opposite sides of an axial plane 101. Similarly, the trim magnet 106 has magnetic poles disposed on opposite sides of an axial plane 107.

Figure 6:
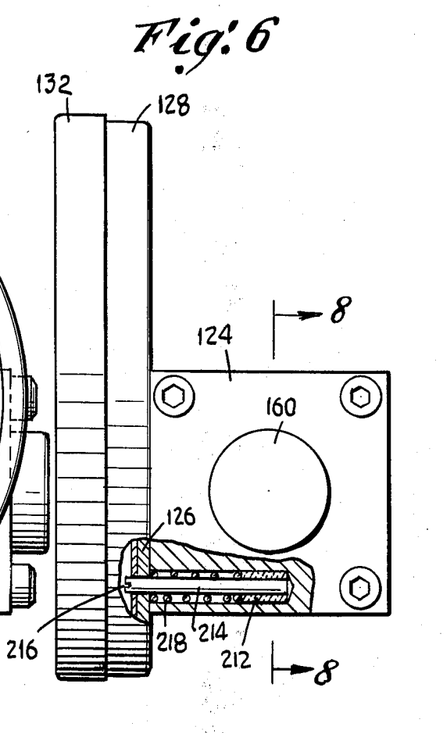
FIG. 6 is a side elevation, partially in section, of the indicating device of FIG. 5, particularly showing the trim or calibrator magnet associated therewith.
Figures 7, 8:
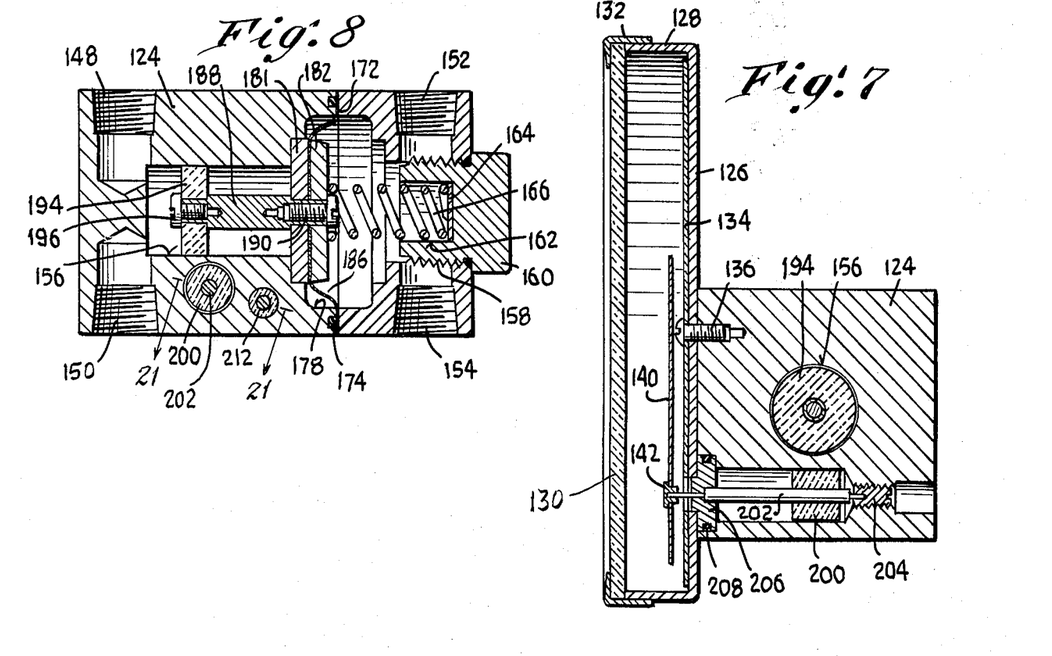
FIG. 7 is a section taken on the line 7—7 of FIG. 5.
FIG. 8 is a section taken on the line 8—8 of FIG. 6.

Another embodiment of the invention is illustrated in FIGS. 5–8, which show a modified form of indicating device 122 comprising a housing 124, pointer casing 126 having an annular flange 128, window 130 and bezel 132. Disposed in the casing 126 is a scale plate 134 which, with the casing 126, is secured to the housing 124 by means of screws 136, as seen in FIG. 7. The scale plate 134 has calibrations or indicia 138, over which a pointer 140 can move. The latter is carried on a hub 142.

Referring particularly to FIG. 8, the housing 124 has pressure ports 148, 150, 152 and 154, and has a longitudinal bore 156 with a threaded portion 158 that is fitted with an end cap 160. The cap 160 has a recess 162 into which there is placed a spacer washer 164, the recess 162 constituting a seat for one end of a compression spring 166. The housing 124 consists of two halves joined at a plane 172, sealed by means of an O-ring 174. One portion 178 of the bore 156 is enlarged, as shown, and receives a piston that is constituted of two parts, 181 and 182. Sandwiched between and held by the parts 181, 182 is a flexible membrane or diaphragm 186 which can take many forms. A connector member 188 is provided, having a threaded bore into which there is screwed a fastener 190 so as to keep the parts 181, 182 tightly together to hold the membrane 186.

It is thus seen that the outer periphery of the membrane 186 is sandwiched between the two halves of the casing 124.

Disposed at the other end of the connector member 188 is a driving permanent magnet 194 which is held by means of a fastener 196. The magnet 194 is axially polarized, being of cylindrical or circular configuration. One end of the cylinder constitutes a north pole, with the other end constituting a south pole.

Referring now to FIGS. 7 and 8, there is associated with the pointer 140 a follower permanent magnet 200 that is carried on a shaft 202, the latter in turn being mounted for rotary movement in bearings 204, 206, with an O-ring 208 providing a seal. The front end of the shaft 202 is reduced, and received in the hub 142 with a friction fit.

The magnet 200 has poles which are disposed on opposite sides of an axial plane as in the previous embodiment, whereby as the pressure difference between the ports 150, 154 (or ports 148, 152) changes, the piston parts 181, 182 will move toward the left or right in FIG. 8, this in turn shifting the driving magnet 194 which in turn effects rotation of the follower magnet 200. Such rotation is reflected in arcuate movement of the pointer 140 over the scale plate 134. Thus, the changes in pressure produce angular deflections of the pointer 140, as can by readily understood.

Referring now to FIG. 6, and in accordance with the invention there is provided for calibrating purposes, an additional, calibration or trim magnet 212 which is of circular configuration, having an axial bore into which there is fitted an adjustment stud 214. The front end of the stud 214 is provided with a screwdriver slot 216 which enables the magnet 212 to be turnably adjusted. Disposed between the magnet 212 and the casing 126 is a compression spring 218, which holds the magnet in adjusted position, and prevents inadvertent movement thereof after a particular adjustment has been obtained.

Figure 9:
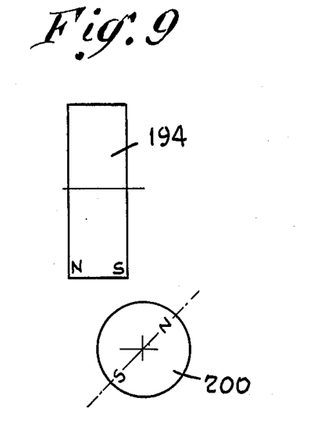
FIGS. 9—11 are diagrammatic representations of a driving permanent magnet and follower permanent magnet of the type employed in the indicating devices of FIGS. 1-8, illustrating a typical response of the follower permanent magnet in the case where the trim magnet of the device is completely removed.
Figure 10:
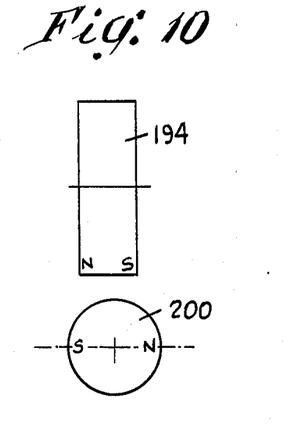
Figure 11:
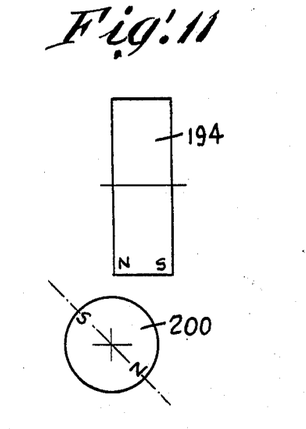

The operation of the embodiment illustrated in FIGS. 5-8 can now be readily understood by referring to these figures, and in addition to FIGS. 9-20. FIG. 9 shows the driving magnet 194 having north and south poles as indicated, and the follower magnet 200, having north and south poles as shown. FIGS. 9-11 depict the operation of the instrument of FIGS. 5-8 in the absence of the trim magnet 212. In FIG. 9, as the driving magnet 194 moves from left to right, corresponding to an increase in pressure at either the port 148 or 150 in FIG. 8, the follower magnet 200 will rotate in a clockwise direction, to the position of FIG. 10, thereafter continuing its rotation to the position of FIG. 11 when the driving magnet 194 has arrived at the position shown therein. Thus, for a predetermined longitudinal movement of the driving magnet 194, the follower magnet 200 has gone through a rotation in a clockwise direction, in this case on the order of 90°.

Figure 12:
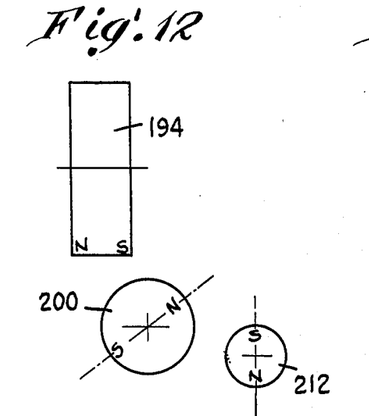
FIGS. 12-14 are diagramatic representations of the driving permanent magnet and follower permanent magnet of FIGS. 9-11, particularly illustrating the effect of the presence of a small trim magnet on the response of the follower magnet for various positions of the driving magnet.
Figure 13:
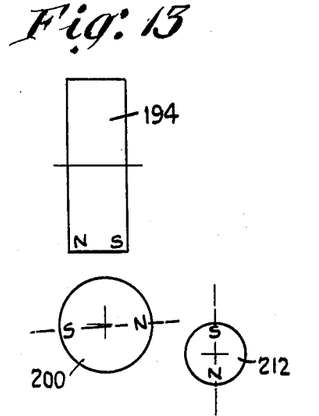
Figure 14:
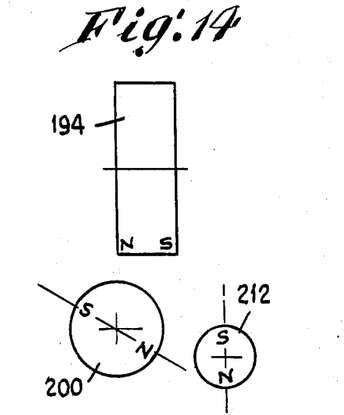

FIGS. 12-14 illustrate the movement of the magnets of the instrument of FIGS. 5-8, but with the addition of the trim magnet 212, the latter having its north and south poles as shown, such poles being disposed in a substantially vertical plane.

Assuming that the driving magnet 194 occupies the same position in FIG. 12 with respect to the follower magnet 200 as that indicated in FIG. 9, the follower magnet 200 will have a slightly different, more clockwise position in FIG. 12 than was the case in FIG. 9, due to the influence of the trim magnet 212. In FIG. 13, the driving magnet 194 has moved toward the right by the same amount as that shown in FIG. 10, but the position of the follower magnet 200 in FIG. 13 has changed in a clockwise direction by an extent slightly less than that shown in FIG. 10, because of the effect of the trim magnet 212. In FIG. 14, with the driving magnet 194 occupying the same position as that shown in FIG. 11, the follower magnet has rotated clockwise by an even lesser amount than that shown in FIG. 11, corresponding to an 80° displacement from the position shown in FIG. 12. Thus by the introduction of the trim magnet, the extent or range of movement of the follower magnet 200 in FIGS. 12-14 has been compressed by approximately 10°, from 90° (as shown in FIGS. 9-11), to 80° (as shown in FIGS. 12-14).

Figure 15:
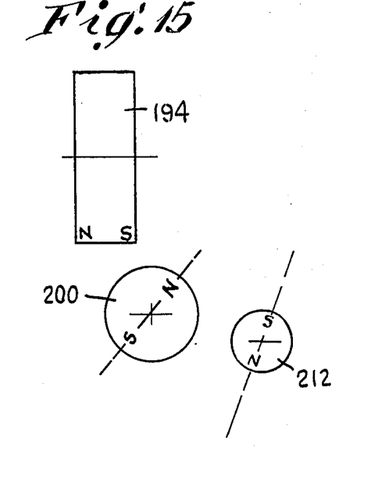
FIGS. 15-17 are diagrams similar to those of FIGS. 12-14 except showing the trim magnet as having been rotated slightly clockwise from the position illustrated in FIGS. 12-14, and illustrating the biasing effect of the trim magnet on the follower magnet, for various positions of the driving magnet.
Figure 16:
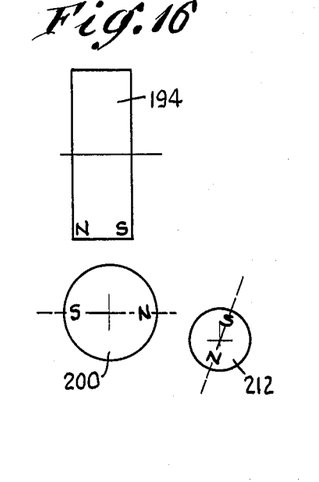
Figure 17:
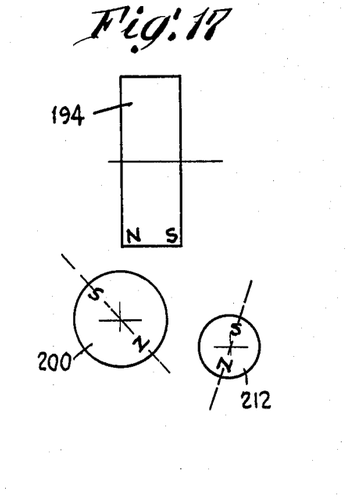

FIG. 15 shows a similar circumstance, wherein the longitudinal displacement of the driving magnet 194 is the same as that shown in FIGS. 9-11 and FIG. 12-14. In FIGS. 15-17, the trim magnet 212 has been rotated approximately 30° clockwise from the vertical, that is 30° displaced from the position illustrated in FIGS. 12-14. Under these circumstances, for the same longitudinal movement of the driving magnet 194, the angular displacement of the follower magnet 200 from the position of FIG. 15 to the position of FIG. 17 is expanded, to approximately 106°. This position is, of course, a result of the same longitudinal movement of the driving magnet 194, with the expansion occuring as a result of the presence of the trim magnet 212.

Figure 18:
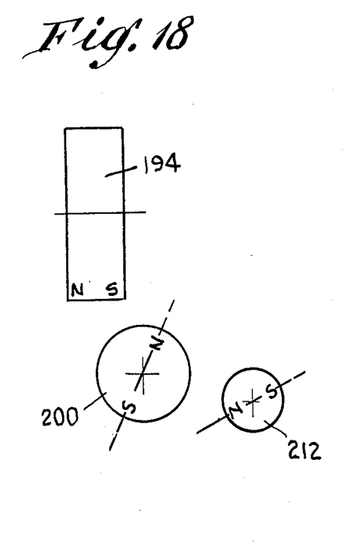
FIGS. 18-20 are diagrams similar to those of FIGS. 12-14 except showing the trim magnet as having been rotated in a clockwise direction by an amount in excess of that shown in FIGS. 15-17, and illustrating the different effect of the trim magnet on the response of the follower magnet.
Figure 19:
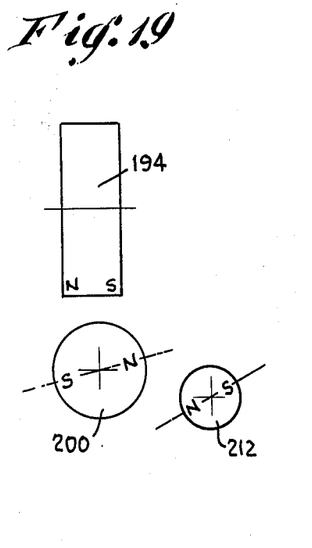
Figure 20:
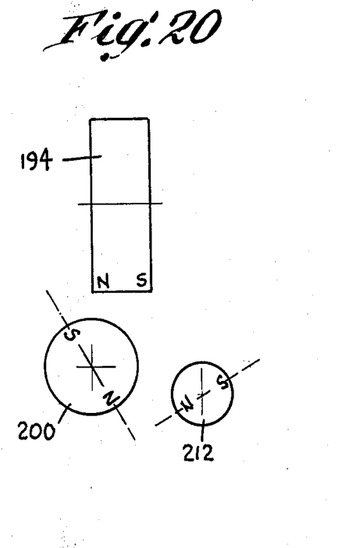

FIG. 18-20 show a similar situation, as far as the longitudinal movement of the driving magnet 194 is concerned. In this case, the trim magnet 212 has been rotated 60° clockwise from the vertical position that was shown in FIGS. 12-14. Now, the angular displacement of the follower magnet 200 has been expanded to approximately 123° for the same stroke of the driving magnet 194. That is, the difference in the angular position of the follower magnet 200 in FIGS. 18 and 20 is 123°, as a result of the new position of the trim magnet 212.

Referring again for the moment to FIGS. 12-14, if the trim magnet 212 were rotated 30° counterclockwise from the position shown therein, the effect on the follower magnet 200 would be to contract the scale from the 90° figure shown in FIGS. 9-11 to approximately 70°. Such a condition is not shown in the drawings, however, but merely mentioned to indicate possible ranges of adjustment of the present indicator device.

Figure 24:
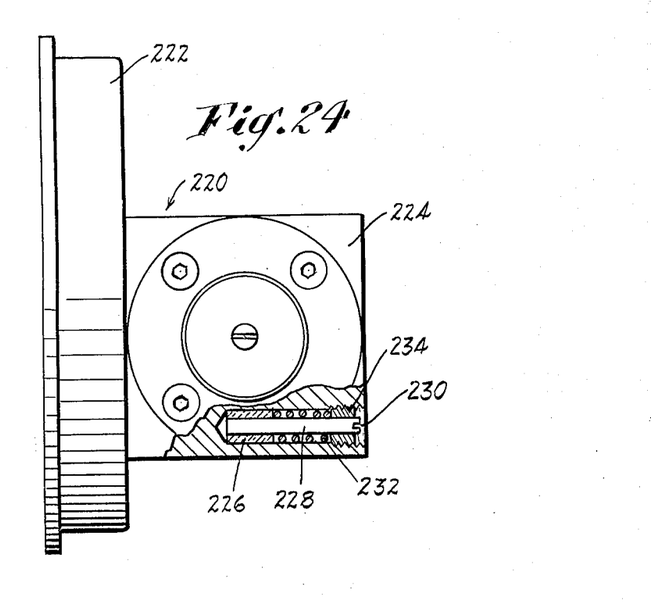
FIG. 24 is a view similar to FIG. 6, of a further modified device, constituting another embodiment of the invention.

Another embodiment of the invention is illustrated in FIG. 24. The indicating device is designated by the numeral 220, having a pointer casing 222 and a housing 224. Disposed in the casing 224 is a driving magnet similar to that indicated 194 in FIGS. 7 and 8, and a follower magnet similar to that labeled 200. By the present invention, there is provided an additional calibration or trim magnet 226 which is carried by the casing, and has an axial bore into which there is fitted an adjustment stud 228. The end of the stud 228 has a screwdriver slot 230 which enables the magnet 226 to be turnably adjusted from the rear of the casing. A biasing spring 232 holds the magnet in adjusted position, as in the previous embodiment, with the spring 232 being held captive by means of a threaded bushing 234. In operation, this embodiment is substantially the same as that discussed in connection with the device of FIGS. 5-8, except that turnable adjustment of the magnet 226 can be accomplished through the rear of the casing 224. This may be desirable in certain installations, as where the front of the casing is either inaccessible, or where space limitations make it inconvenient to adjust the trim magnet through the pointer casing.

It can now be seen from the foregoing that I have provided an improved indicating instrument characterized by the interaction of permanent magnets to effect its readings, wherein a simple and effective, cost-saving calibration means is utilized to enable preprinted scale plates to be used in the manufacture. The instrument movement can be quickly and conveniently adjusted to adapt it to the scale plate, is simple in construction, and rugged and reliable in use. Recalibration is possible at any time.

In addition, complete range changes can be made in the field by simply shipping a customer or distributor a pre-printed dial and range spring, which he can calibrate in his plant.

Variations and modifications of porting locations and sizes, and magnet sizes used as described in this patent application, or modifications in the basic pressure housing package are possible without departing from the spirit of the invention, as defined in the claims.

I claim:

1. An adjustable indicating device adapted to enable its range to be expanded or contracted, with compensatory "zero" adjustment, comprising in combination:
   (a) a scale plate having indicia thereon in a housing representative of a range of values,
   (b) a pivotally mounted indicating member movable in an arc over said scale plate and adapted to designate various values thereon,
   (c) means operationally coacting with means that is responsive to a change in a condition, for shifting said indicating member over said scale plate,
   (d) said shifting means comprising a follower permanent magnet, comprising means for mounting said follower magnet for rotative movement, and comprising a driving permanent magnet which shifts in response to changes in said condition and which is adapted to react with the said follower magnet,
   (e) adjustable magnetic means comprising a trim permanent magnet disposed in said housing within the sphere of influence of the driving permanent magnet and the follower permanent magnet, for altering the reaction between said driving and follower permanent magnets so as to effect either an expansion or else a contraction of the range of movement of said indicating member as the driving permanent magnet responds to a predetermined change in said condition, and
   (f) "zero" mechanical adjustment means providing an adjustable connection between the indicating member and the follower permanent magnet, thereby to enable the indicating member to be adjusted to a "zero" position with respect to the scale plate, for either an expanded or a contracted range of the indicating member.

2. The invention as defined in claim 1, wherein:
   (a) said driving permanent magnet and follower magnets are disposed in a housing, and
   (b) means pivotally mounting said trim permanent magnet in said housing to enable an adjustable turning movement thereof to be effected therein.

3. The invention as defined in claim 1, wherein:
   (a) said adjustable connection means comprises a friction joint between the indicating member and the follower magnet.

4. The invention as defined in claim 3, wherein:
   (a) the friction joint comprises a hub on the indicating member, and
   (b) a shaft connected with the follower magnet,
   (c) said hub being pressed onto said shaft so as to be frictionally held thereon.

5. The invention as defined in claim 1, wherein:
   (a) said follower magnet is turnable about an axis, is of generally cylindrical configuration, and has magnetic poles disposed on opposite sides of an axial plane,
   (b) said adjustable magnetic means comprising a trim magnet rotatable about an axis generally parallel to the axis of rotation of the follower magnet.

6. The invention as defined in claim 5, wherein:
   (a) said trim magnet has magnetic poles disposed on opposite sides of a plane passing substantially along its axis of rotation.

7. The invention as defined in claim 5, wherein:
   (a) said trim magnet is of generally cylindrical configuration, and has magnetic poles disposed on opposite sides of an axial plane.

8. The invention as defined in claim 1, wherein:
   (a) said follower permanent magnet is turnable about an axis, and
   (b) means mounting the driving permanent magnet for movement in a direction transverse to the axis of the follower permanent magnet.

9. The invention as defined in claim 1, wherein:
   (a) said adjustable means comprises a generally cylindrical trim magnet.

10. The invention as defined in claim 1, wherein:
    (a) said adjustable means comprises a trim magnet,
    (b) the influence of the driving magnet on the follower magnet being approximately seven times the influence of the trim magnet on the follower magnet.

11. The invention as defined in claim 1, wherein:
    (a) said adjustable magnetic means comprises a trim magnet,
    (b) the distance between the adjacent exterior surfaces of the driving magnet and follower magnet is on the order of from 40% to 60% of the distance between the adjacent exterior surfaces of the follower magnet and the trim magnet.

12. The invention as defined in claim 1, wherein:
    (a) said adjustable magnetic means comprises a trim magnet having a generally cylindrical configuration,
    (b) said driving and follower magnets having generally cylindrical configurations.

13. The invention as defined in claim 12, wherein:
    (a) the axis of the driving magnet is transverse to the axes of the follower magnet and trim magnet.

14. The invention as defined in claim 1, wherein:
    (a) said adjustable magnetic means comprises a trim magnet, and
    (b) means frictionally holding the trim magnet in a fixed adjusted position.

15. The invention as defined in claim 14, and further including:
    (a) tool-engageable means for applying an adjusting, turning movement to the trim magnet.

16. The invention as defined in claim 14, wherein:
    (a) said frictional holding means comprises a coil spring engageable with the trim magnet.

17. The invention as defined in claim 1, wherein:
    (a) said adjustable magnetic means comprises a trim magnet,
    (b) said follower and trim magnets being circular.

18. The invention as defined in claim 17, wherein:
    (a) said follower and trim magnets are disposed between adjacent trans-axial planes.

19. The invention as defined in claim 1, wherein:
    (a) said adjustable magnetic means comprises a trim magnet,
    (b) said trim and follower magnets being cylindrical and each having an axial bore.

20. The invention as defined in claim 19, wherein:
    (a) said trim magnet has an adjustment stud extending into its axial bore.

21. The invention as defined in claim 20, wherein:
    (a) said scale plate has an aperture,
    (b) said adjustment stud being accessible through the aperture, and
    (c) a spring disposed between said scale plate and trim magnet, frictionally engaging the latter.

22. The invention as defined in claim 20, wherein:
(a) said adjustment stud is accessible from the rear of the device.

23. The invention as defined in claim 1, wherein:
(a) said adjustable magnetic means comprises a trim magnet,
(b) the driving magnet is on the order of ⅜ of an inch in diameter,
(c) the follower magnet is on the order of ⅜ of an inch in diameter,
(d) the trim magnet is on the order of ¼ of an inch in diameter,
(e) said follower magnet having an axis disposed in a plane approximately ⅜ of an inch below the line of movement of the driving magnet,
(f) the axis of the trim magnet being disposed approximately ⅛ of an inch below the axis of the follower magnet and approximately ½ inch to one side of the follower magnet.

24. The invention as defined in claim 1, wherein:
(a) the axes of the trim magnet and follower magnet are disposed in a common plane which makes substantially a 13° angle with respect to the line of travel of the driving magnet.

25. The invention as defined in claim 1, wherein:
(a) the adjustable magnetic means is closer to the follower magnet than it is to the driving magnet at all times during the movement of the driving magnet throughout its range.

26. An adjustable magnetically operating indicating device adapted to enable its range to be expanded or contracted by auxiliary permanent magnet means, comprising in combination:
(a) a scale plate member and a support therefor in a housing, said scale plate member having indicia thereon representative of a range of values,
(b) a pivotally mounted indicating member and a support therefor, said pivotally mounted indicating member being movable in an arc over said scale plate member and being adapted to designate various values thereon,
(c) means operatively coacting with means that is responsive to a change in a condition, for shifting said indicating member over said scale plate member,
(d) said shifting means comprising a follower permanent magnet, comprising means for mounting said follower magnet for rotative movement, and comprising a driving permanent magnet which shifts in response to changes in said condition and which is adapted to react with said follower magnet, and
(e) adjustable magnetic means comprising a trim permanent magnet disposed in said housing within the sphere of influence of the driving permanent magnet and the follower permanent magnet, for altering the reaction between said driving and follower permanent magnets so as to effect either an expansion or else a contraction of the range of movement of said indicating member as the driving permanent magnet responds to a predetermined change in said condition, said trim magnet being closer to said follower permanent magnet than it is to the driving permanent magnet at all times during the movements of the driving magnet throughout its range.

27. The invention as defined in claim 26, and further including:
(a) mechanical "zero" adjustment means for mounting one of said members on its support to enable it to be shifted with respect to the other member, for effecting a "zero" setting of the indicating member independently of the adjustment of said adjustable magnetic means.

28. The invention as defined in claim 26, wherein:
(a) said driving permanent magnet and follower magnet are disposed in a housing, and
(b) means pivotally mounting said trim permanent magnet in said housing to enable an adjustable turning movement to be effected therein.

29. The method of calibrating a rotary-type indicating meter of the kind in a housing having a means operationally coacting with a movable driving permanent magnet which changes its position in response to changes in a variable condition, a turnably-mounted follower permanent magnet which is arcuately moved in response to the movements of the driving magnet, and an indicator member which is actuated by the follower magnet as the latter responds to the movements of the driving magnet, comprising the steps of placing a trim permanent magnet in the housing in the field of influence of said first-mentioned magnets, and shifting the trim magnet to expand or contract the range of movement of the indicator member for a given predetermined range of movement of the driving permanent magnet and adjusting said indicator member relative to the follow magnet.

30. The method of claim 29, and in which said adjusting the indicator member includes the further step of shifting the indicator member with respect to the follower magnet in order to bring the indicator member to a designated "zero" starting position corresponding to a predetermined starting position of the driving magnet.

31. The method of claim 30, wherein the shifting of the trim magnet is alternated with the shifting of the indicator member.

* * * * *